March 11, 1969   R. H. LOUGHRIDGE ET AL   3,432,218
HIGH SPEED MECHANICAL VARIABLE AMPLITUDE NUTATING MECHANISM
Filed Sept. 30, 1966

INVENTORS
RAYMOND H. LOUGHRIDGE
CONRAD TRYBUS

BY:
Oldham & Oldham
ATTORNEYS

United States Patent Office 3,432,218
Patented Mar. 11, 1969

3,432,218
HIGH SPEED MECHANICAL VARIABLE
AMPLITUDE NUTATING MECHANISM
Raymond H. Loughridge, Kent, and Conrad Trybus, Cuyahoga Falls, Ohio, assignors to Goodyear Aerospace Corporation, Akron, Ohio, a corporation of Delaware
Filed Sept. 30, 1966, Ser. No. 585,708
U.S. Cl. 350—6                                4 Claims
Int. Cl. G02b 27/18

ABSTRACT OF THE DISCLOSURE

A high speed mechanical nutating device which rotates a lens in the plane of the lens to eliminate distortions of the optical image focused by the lens. The lens is radially offset without disturbing a parallel relationship between the axis of the lens and the optical axis of the system upon rotation of the lens in the plane of the lens about an axis coincident with the optical axis of the system.

---

This invention relates to a high speed mechanical nutating device, and more particularly to a mechanism for nutating a lens in the plane of the lens to eliminate distortions to any optical image received through or projected through the lens.

Heretofore it has been known that there have been many and various types of nutating apparatus both electrical and mechanical. However, the mechanical systems have usually tilted a focusing lens on its axis and then rotated the tilted lens to achieve a nutation. Certain distortions to the projected image is inherent in this system, and such distortion is undesirable. Further, electrical nutating apparatus also achieve some distortion due to the inherent nonuniformity of the magnetic fields utilized to effect the nutation. Therefore, it is necessary in the art to have a device to improve the resolution and clarity of an optical image being nutated to enhance the resultant usage of such nutated image.

Therefore, it is the general object of the present invention to avoid and overcome the foregoing and other difficulties of and objections to prior art practices by the provisions of a mechanical nutator which in essence provides a focusing lens with orbital motion in the plane of the lens so that there cannot be any distortion of the optical image focused by the lens.

A further object of the invention is to provide a simple mechanical device to control, adjustably, the nutation of an optical image, which adjustment is very easy, and which utilizes a counter-balancing weight to offset the eccentric mounting of the lens during the nutation action.

The aforesaid objects of the invention and other objects which will become apparent as the description proceeds are achieved by providing in a high speed variable amplitude mechanical nutator the combination of a fixed cylindrically-shaped housing open at both ends, a lens rotatably mounted around its axis within the housing whereby the axis of the lens is substantially parallel to the axis of the housing, cam means slidably carried within the housing to adjustably radially offset the lens without changing the parallel relation of its axis to the axis of the housing, and means to rotate the lens within the housing on a rotative axis coincident with the axis of the housing.

For a better understanding of the invention reference should be had to the accompanying drawings wherein.

Figure 1:
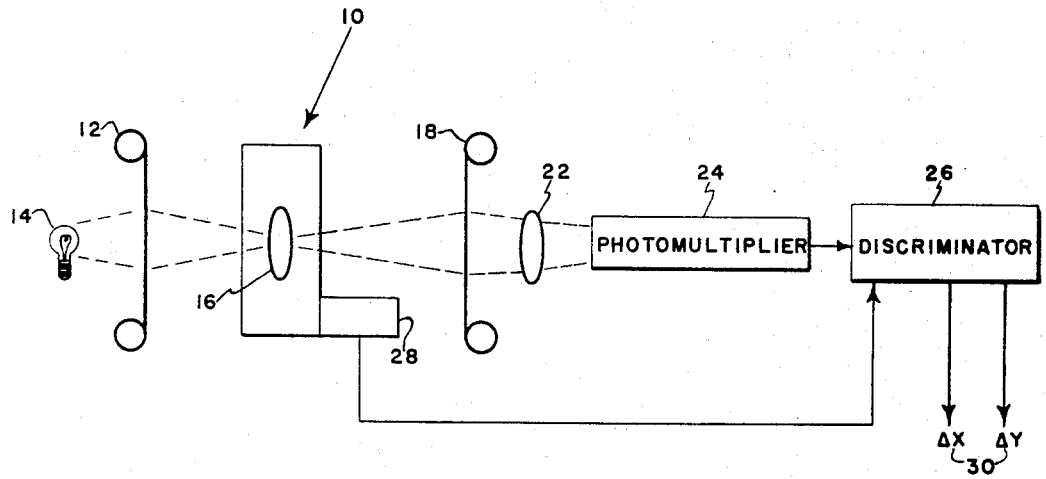
FIGURE 1 is a schematic illustration of the use of the mechanical nutator in a correlation system.

For an understanding of a typical example of use with the mechanical nutator of the invention, reference should be had to FIGURE 1 wherein the numeral 10 indicates generally a mechanical nutator incorporating the structural features of the invention. Use of the nutator 10 is made by backlighting a negative film 12 with a light 14, with the blacklighted negative then focused in the nutator 10 by suitable lens 16. The lens 16 in the nutator 10 then nutates the image, which nutated image is then focused onto a positive 18. The amount of light passing through the positive is then focused by a suitable lens 22 onto a photomultiplier 24. Naturally, since the negative 12 is projected onto the positive 18, a substantial match of the two, or correlation, will occur when a minimum amount of light is detected by photomultiplier 24. The signal from the photomultiplier is sent to a discriminator 26 and therein coordinated with a signal from the motor drive 28 of the nutator 10 so that X and Y error signals 30 may properly show the error direction between the negative 12 and positive 18. This system is a well known "map matching" or correlation system wherein the nutation necessary to achieve correlation may be done either mechanically or electrically. This invention relates to the specific mechanical characteristics of the nutator 10, and these characteristics will be explained in detail hereinafter.

Figure 2:
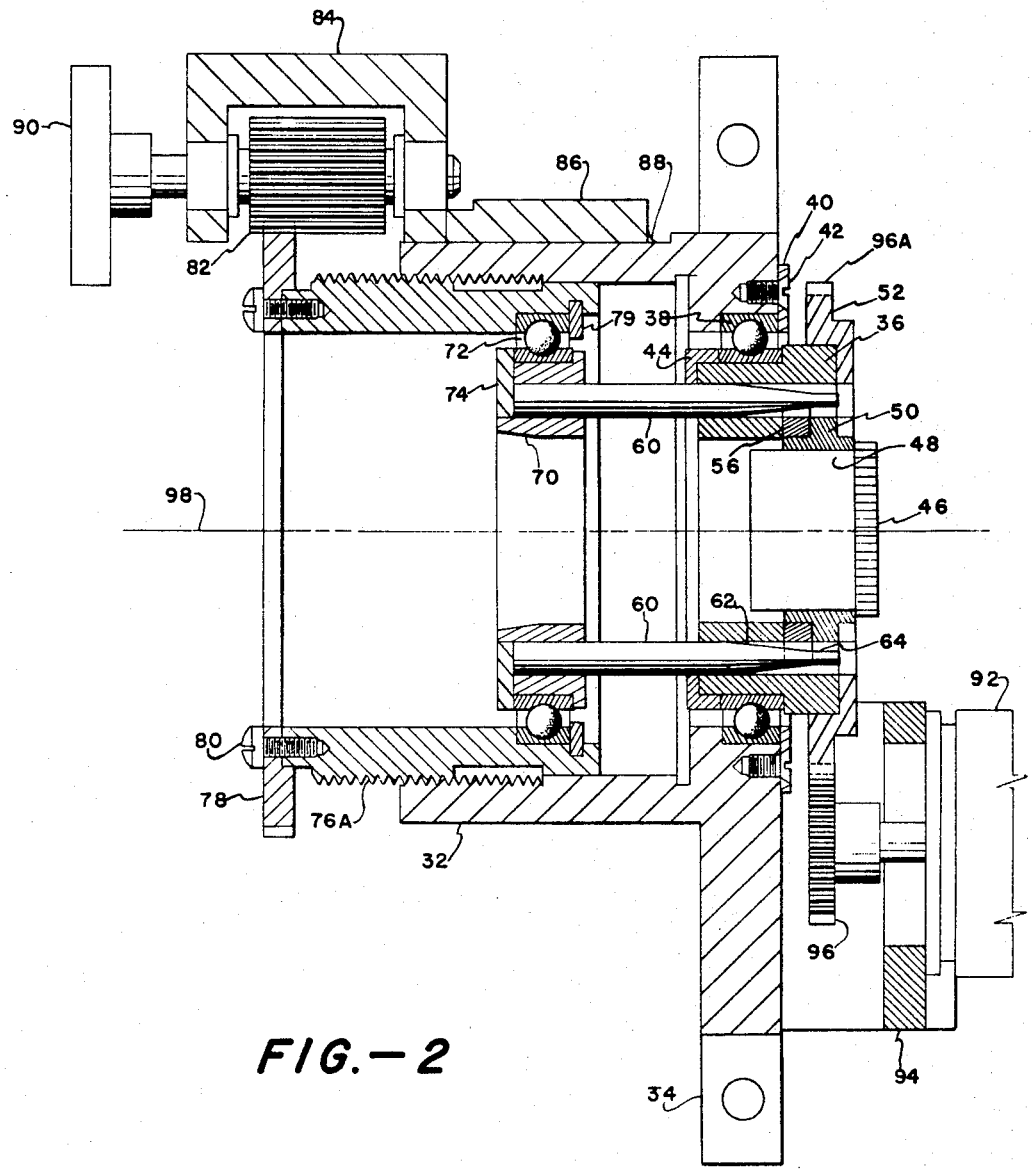
FIGURE 2 is an enlarged vertical cross sectional illustration of all the mechanical components of the nutator of FIGURE 1.

With reference to the cross sectional illustration of the nutator 10 shown in FIGURE 2 of the drawings, the numeral 32 illustrates a cylindrically-shaped housing open at both ends and including a mounting flange 34. A pin guide and lens mounting frame 36 is rotatably mounted by a ball bearing 38 to one end of the housing 32. The bearing 38 is retained in position by a bearing retainer ring 40 secured to the housing 32 by suitable screws 42 on the outward end, and with a bearing retaining flange 44 secured over the inner end of the frame 36. A focusing lens 46 mounted at one end of a cylindrical housing 48 is received and carried within a positioning frame 50, which frame 50 is received within the pin guide and lens mounting frame 36. A gear and flange unit 52 holds the frame 50 in relation to the frame 36, and is secured to the frame 36 by suitable means such as screw 54, as seen in FIGURE 3.

The lens 46 and associated housing 48 and frame 50 are slidable radially, relative to the mounting frame 36, as will be more fully described hereinafter. When such radial movement is achieved, it is necessary to counterbalance, and hence a counterweight 56 is removably received behind the frame 50 and retained in relation relative to frame 36, as clearly shown in FIGURE 2. The counterweight 56 is also slidable radially relative to the frame 36.

Figure 4:
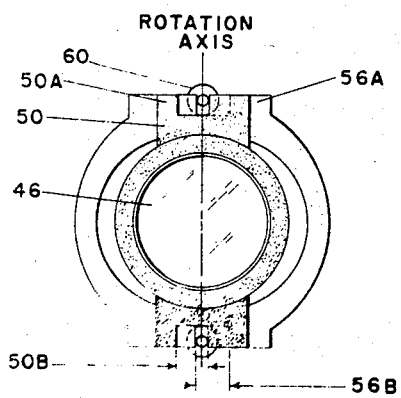
FIGURE 4 is an end elevation of the lens and counterweight in the neutral or central position where no nutation will occur.
Figure 5:
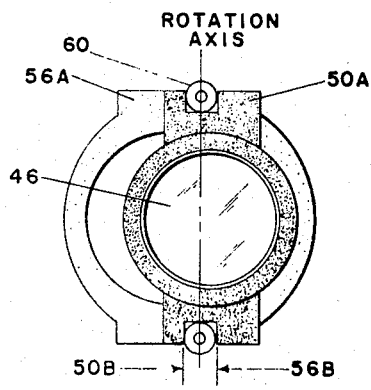
FIGURE 5 is an end elevation illustrating how the camming action has offset the lens and the counterweight in opposite directions whereby nutation with the lens may be achieved upon the rotation thereof within the housing.
Figure 3:
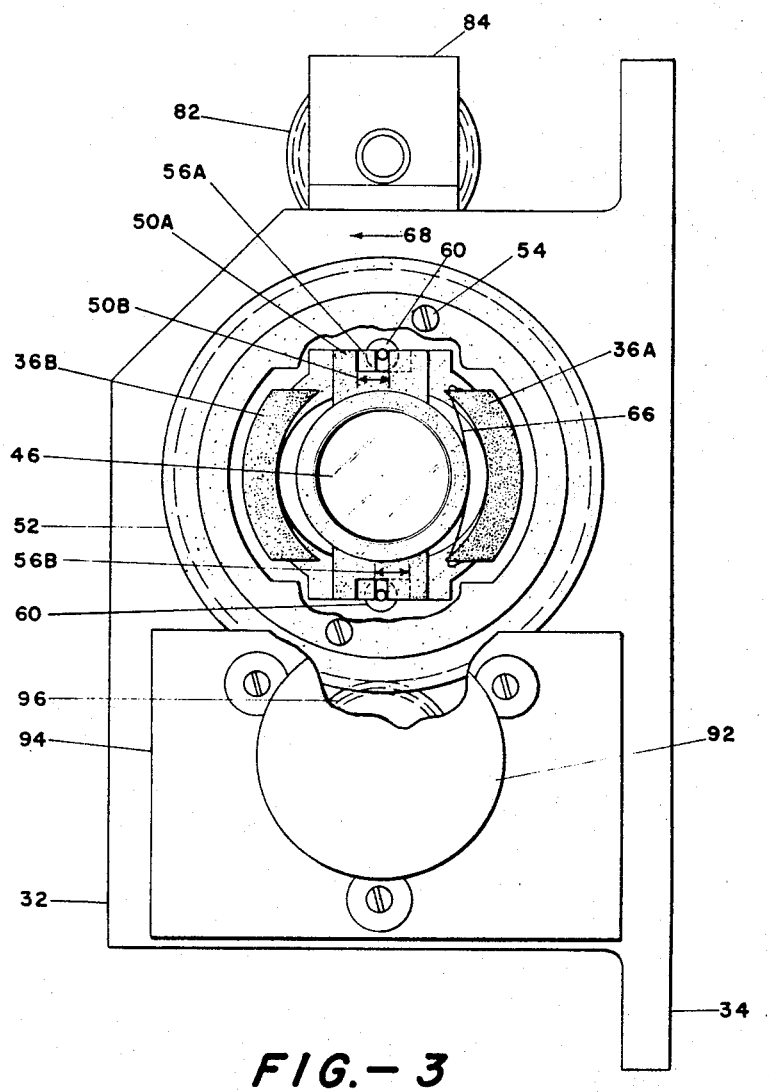
FIGURE 3 is an end view, partially broken away, of the lens and counterweight mounting within the housing.

As shown in FIGURE 3 of the drawings, the pin guide and lens mounting frame 36 has a pair of forwardly extending arcuate-shaped retaining ears 36A and 36B which allow sideways sliding movement of both the lens 46 and counterweight 56, but outwardly limit such sideward sliding movement. Both the lens frame 50 and counterweight 56 have flanges projecting from both the top and bottom thereof in 180° opposed relationship, which flanges are indicated by numeral 50A and 56A, respectively, as best seen in FIGURES 3 through 5. Each of the flanges 50A and 56A also has an offset cut out space 50B and 56B, respectively. However, the cut outs 50B and 56B are not coincident, and when the lens 46 is centrally aligned wtih the axis of the housing 32, an overlap between the cut outs as shown in FIGURES 3 through 5 occurs.

In order to align the coutnerweight 56 and the lens 46 and the respective arms 50A and 56A, the invention contemplates that a pair of pins 60 having tapered portions 62 and reduced diameter end portions 64 will be slidably received in the pin guide and lens mounting frame 36 so that the reduced diameter portion 64 projects through the aligned slots or cut out portions 50B and 56B of the lens and counterweight, respectively. The lens 46 and counterweight 56 are then urged to the relationship indicated in FIGURES 3 and 4 by a small leaf spring 66 sceured at each end to the ends of one of the projections 36A and normally urging the lens 46 in a direction indicated by an arrow 68, as seen in FIGURE 3.

The pins 60 are slidable relative to the pin guide and lens mounting frame 36, and are mounted in fixed relation at their opposite ends in a pin retaining ring 70. The ring 70 is rotatably mounted within the housing 32 by a suitable ball bearing 72. The bearing 72 is retained relative to the ring 70 by a bearing retaining flange 74, and relative to a sliding bearing holder 76 by a suitable true arc ring 79. The bearing holder 76 is in threaded engagement with the housing 32, as threads 76A on the bearing holder are adapted to screw into an internally threaded portion within the housing 32. The bearing holder 76 is secured in fixed rlationship to a flange gear 78 by suitable screws 80. In order to achieve rotation of the gear 78, a suitable pinion gear 82 is rotatably mounted by a frame 84, which frame 84 has a flange 86 secured to the housing 32 by suitable means, such as welding at 88. An adjusting knob 90 is directly connected to the pinion gear 82 whereby rotation of knob 90 rotates pinion gear 82 which in turn causes rotation of the gear 78. In this manner, the bearing holder 76 may be moved inwardly or outwardly rleative to the housing 32, and thus adjust the relationship of pins 60 relative to the arm or flange portions 50A and 56A of the lens frame and counterweight, respectively. Naturally, the knob 90 could be replaced with a suitable gear arrangement driven by a servo actuated by the X and Y error signals.

It should clearly be understood, that in the normal or non-nutating position for lens 46, the reduced diameter portions 64 of pins 60 will be in engagement with the slots 50B and 56B, as is illustrated in FIGURES 3 and 4. When, however, the tapered portions 62 of the pins 60 are advanced by the rotation of the bearing holder 76, it causes the lens holding frame 50 to be forced to the right, while the counterweight 56 is forced to the left, as is clearly evident in FIGURE 5 of the drawings. This naturally causes an offset of the axis of lens 46 from its rotation axis, as defined by the bearing 38. Naturally, this offset means that a nutation of any image focused through the lens 46 will be effected. Therefore, it should be understood that the relative degree of nutaiton of image focused through the lnes 46 may be achieved by adjusting the knob 90 to control the relative sliding relation of pin 60 to the cam arrangement of the tapered portions 62 with the flanges 50A and 56A on the lens frame 50 and counterweight 56, respectively.

Rotative driving of the pin guide and lens mounting frame 36 may be accomplished in any convenient manner. The invention contemplates that a suitable motor 92 mounted to the flange 34 of the housing 32 by a suitable connecting frame 94 will drive a gear 96. The gear 96 engages with a geared periphery 96A on the retaining flange 52. Thus, rotation of gear 96 by drive motor 92 will cause a rotation of the entire assembly including the pin guide and lens mounting frame 36, the pin 60, and the pin retaining ring 70. Since the adjusting knob 90 does not rotate, the nutation may be adjusted even during the rotative operation of the lens 46 by the motor 92.

Further, since there is no change in the angle of the planar relaitonship of the lens 46 to the axis 98 through the housing 32, there can be no distortion of the nutated image. Naturally, the invention contemplates that the mechanical nutator 10 may be used for projecting a nutated image as indicated in the schematic of FIGURE 1, or may be adapted to receive an image, much in the manner of a camera, and nutate this received optical image.

The cammed relationship between the tapered portions 62 of the pins 60 and the cut out sections 50B and 56B of the lens frame 50 and counterweight 56, respectively, constitutes the essence of the invention. The adjustment of the counterweight in an opposite direction to the movement of the lens provides a perfect balance when the entire assembly is rotated so that operation will be without vibration or other undesirable side effects caused by an unbalance. Further, the counterbalancing assures that the change in camming relation during actual rotation may easily and readily be accomplished. The invention contemplates that normally nutation will start at a maximum displacement of the lens 46 from the axis of rotation, with this distance gradually narrowed as correlation accuracy is increased. The apparatus of the invention provides a nondistorted nutation, where the frequency of nutation may be very high because of the compact and structurally balanced mechanical relation of the nutator components. The apparatus represents great simplicity and reduction of expense over comparable electronic nutation mechanism, while having greater accuracy. Further, the ability to vary the amplitude of the nutation is a unique property further adding to the improved apparatus.

What is claimed is:

1. A high speed variable amplitude nutator which includes:
   a fixed cylindrically shaped housing opened at both ends and having an axis,
   a lens having an axis rotatably mounted within the housing whereby the axis of the lens is substantially parallel to the axis of the housing,
   cam means slidably carried within the housing to adjustably radially offset the lens without changing the parallel relation of its axis to the axis of the housing,
   means to rotate the lens within the housing on a rotative axis coincidental with the axis of the housing without changing the parallel relation of the axis of the lens to the axis of the housing, and
   a counterweight mounted adjacent to the lens and movable in a radial direction opposite to the lens by the cam means so as to counterbalance the eccentric position and rotation of the lens which is characterized by the counterweight and the lens each having diametrically opposed arms with apertured portions at the end of the arms, and where the cam means is a pair of pins each having a conically tapered surface whereby movement of the conically tapered surface of the pins axially into the apertured portions of the arms forces the arms in opposite directions to thereby move the lens and counterweight in equal and opposite directions radially relative to the axis of the housing.

2. A nutator according to claim 1 where the radial adjustability of the lens by the cam means can be accomplished without altering the parallel relation of the axis of the housing to the axis of the lens during rotation of the lens within the housing.

3. A nutator according to claim 1 where the counterweight and lens are normally urged towards coincident alignment whereby the axis of the lens is coincident with the axis of the housing, and where the cam means overcomes this urge.

4. A high speed variable amplitude nutator which includes:
   a housing having an axis, a lens having an axis rotatably mounted within the housing whereby the axis of the lens is substantially parallel to the axis of the housing, cam means slidably carried within the housing to adjustably radially offset the lens without changing the parallel relation of its axis to the axis of the housing, a counterweight mounted adjacent to the lens and movable in a radial direction opposite to the lens to counterbalance the eccentric position upon rotation of the lens, opposed arms having apertured portions at the ends thereof mounted to both the counterweight and the lens which is characterized by the cam means comprising a pair of pins each having conically tapered surfaces whereby movement of the conically tapered surface of the pins axially into the apertured portions of the arms forces the arms in opposite direction to thereby move the lens and counterweight in equal and opposite directions radially relative to the axis of the housing, and means to rotate the lens within the housing on a rotative axis coincident with the axis of the housing without changing the parallel relation of the axis of the lens to the axis of the housing.

References Cited

UNITED STATES PATENTS

| | | | |
|---|---|---|---|
| 2,894,430 | 7/1959 | Schuch | 350—247 X |
| 3,110,762 | 11/1963 | Frank | 350—6 X |
| 3,291,996 | 12/1966 | Stimson | 350—247 |
| 3,359,849 | 12/1967 | Friedman | 350—247 |
| 3,364,356 | 1/1968 | Jones | 350—247 |

DAVID SCHONBERG, *Primary Examiner.*

P. R. GILLIAM, *Assistant Examiner.*

U.S. Cl. X.R.

350—7, 247